Jan. 21, 1947.  W. J. CRUMP  2,414,637
UNIVERSAL DRILL SUPPORT
Filed May 17, 1944
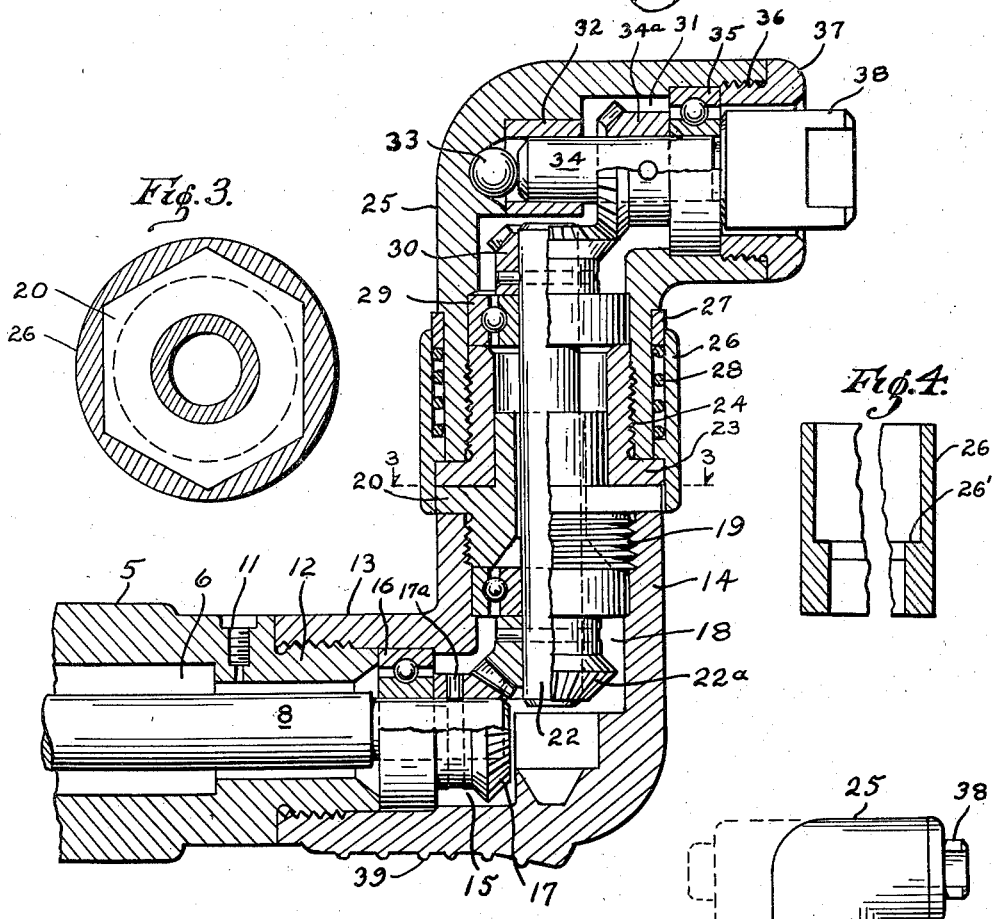
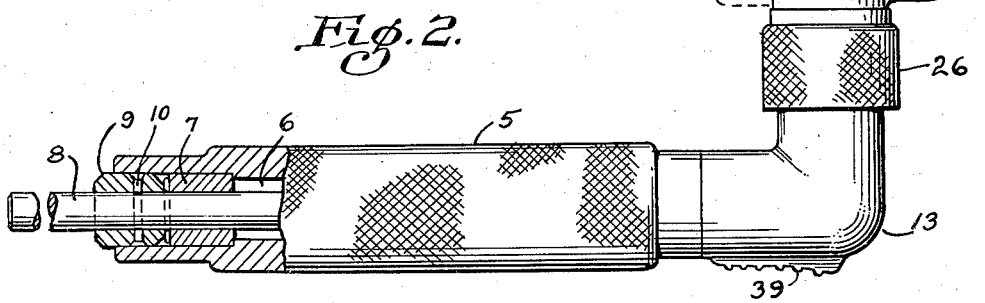
INVENTOR.
Woodford J. Crump
BY Carlos G. Stratton
ATTORNEY.

Patented Jan. 21, 1947

2,414,637

UNITED STATES PATENT OFFICE 2,414,637

UNIVERSAL DRILL SUPPORT

Woodford J. Crump, Los Angeles, Calif., assignor to Aircraft Tools, Inc., Los Angeles, Calif., a corporation Application May 17, 1944, Serial No. 535,898

4 Claims. (Cl. 77—31)

My invention relates to machine or hand tools and more especially to a drill adapted for universal movement.

An object of the invention is to provide a simple, practical and efficient tool of the character described.

Another object is to provide an improved drill for hand use capable of positioning in any direction.

A further object is to provide a drill tool adapted for universal swivel movement, a full 360 degrees in two directions at right angles to each other.

My invention has for its object to provide such means that are positive in operation, convenient in use, easily installed in a working position and easily disconnected therefrom, economical of manufacture, relatively simple, and of general superiority and serviceability.

Like reference characters in the drawing designate similar parts in the several views, and Fig. 1 is a view in central section showing an embodiment of my invention; Fig. 2 is an elevational view of the same on a reduced scale; Fig. 3 is a sectional plan view on line 3—3 of Fig. 1, and Fig. 4 is a broken sectional view of the locking collar or bushing.

Referring more particularly to the drawing, I show a universal drill comprising an elongated handle member 5 preferably having a knurled surface portion and a bore 6 extending the length thereof, the bore having an enlarged end portion to receive a bearing 7 for a shaft 8 on which a thrust collar 9 is positioned and secured thereto as by a pin 10. A threaded side-bore 11 may be provided as shown in Fig. 1, to permit the introduction of a lubricant and a plug or lubrication fitting. Handle member 5 has a reduced end portion 12 externally threaded to secure an angle head member 13 thereon, member 13 having an extension portion 14 disposed at right angles to the axis of shaft 8. Member 13 has a bore 15 provided with a slightly enlarged bore portion to receive a bearing 16 in a pressed fit therewith, bearing 16 being adapted to receive the inner end portion of shaft 8, on which a bevel gear 17 is suitably secured as by a locking pin 17a.

Extension portion 14 is provided with a bore 18, the outer portion of which is threaded at 19 for inter-fitting engagement with the threaded portion of a locking collar 20, which secures a bearing 21 in bore 18 for mounting a shaft 22. The locking collar 20 is a hexagonal nut, as shown in Fig. 3, which extends over and rests upon the extension portion 14 when said nut with its threaded portion is turned home. Shaft 22 has secured thereto a bevel gear 22a which meshes with and is driven by bevel gear 17 and is suitably secured on shaft 22 as by a locking pin extending therethrough.

Locking collar 20 has a cylindrical portion adapted to extend into the bore of a swivel collar 23 which has a flanged hexagon face portion arranged for rotative movement with a face of locking collar 20. Collar 23 has a threaded portion 24 for a similarly threaded portion of a swivel head 25, and a knurled locking sleeve 26 surrounds and is mounted exteriorly of the threaded portion of the swivel head 25. By means of an annular stop 27 secured on head 25 and extending partially within the bore of sleeve 26 and an annular, inwardly directed shoulder 26' on said sleeve 26, Figs. 1 and 4, a space is provided between said swivel head portion and said locking sleeve 26 for a spring 28 which bears against said stop 27 and exerts its tension against the shoulder 26' of said sleeve. The bore of the sleeve 26, below the shoulder 26' is hexagonal to conform to the hexagonal outline of the swivel collar 23 and the lock collar 20, which latter, when engaged by said hexagonal sleeve end, prevents the swiveling or rotative movement of the head 25. Normally the shoulder 26' is held by the spring 28 in engagement with a face of the swivel collar 23, which limits the movement of the sleeve beyond the swivel and lock collars. When it is desired to adjust the head 25 to suit the needs and requirements of the operator, the sleeve 26 is moved against the tension of the spring 28 a distance sufficient to cause the end thereof to clear the hexagonal nut 20 of the lock collar, at which time, the head 25, may be turned on the face of the collar 20 to the position desired. After the head is adjusted, the manual release of the sleeve enables it to return to its normal position of locking the head 25 on the collar 23 against relative movement.

A bearing 29 is suitably secured within the bore of head 25 and provides mounting for the upper end of shaft 22, which has a bevel gear 30 secured thereon in the manner of gears 17 and 22a. Swivel head 25 has a bore 31 and a reduced bore to receive a shaft bearing 32 and a thrust ball bearing 33 for the end of a shaft 34. Shaft 34 has a bevel gear 34a secured thereon which meshes with bevel gear 30 and is driven thereby. Bore 31 is provided with a recessed portion to receive a bearing 35 for shaft 34 and is further provided with a threaded portion 36 for threaded engagement with a nose collar 37 into which extends a drill nose 38 suitably secured on shaft 34 but rotatably free from collar 37. Head member 13 may if desired have a ribbed thumb pad portion 39 to aid in using the tool.

The operation of the invention should be clear from the foregoing description. The drill nose 38 is driven by shaft 34 through bevel gears 34a and 30 from shaft 22. Shaft 22 is driven by shaft 8 through bevel gears 22a and 17. It will be understood that shaft 8 may be connected to and driven by a portable motor drive through suitable reduction gearing if desired, or shaft 8 may be connected to a shaft connected to any suitable driving force in the conventional manner. It should also be clear that body and handle member 5 is rotatable with respect to shaft 8, and thus the angle position of member 5 may be varied at will. Swivel head 25 will be seen from the drawing and description to be rotatable through 360 degrees on angle member 13, and in this manner a drill secured in drill nose 38 may be adjusted to any of the angles defined by the prismatic flange 20, and it will also be clear that, since body and handle member 5 can be rotated about the axis of shaft 8, the drill may be positioned at any angular position with respect to both shafts 8 and 22.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a drill, a body and handle member, an angle housing threadedly secured to said body and handle member and provided with an internal bearing, an axial drive shaft mounted in said bearing and having at the end thereof a bevel gear, another bearing in said angle housing, a member threading in said housing to hold said bearing in place and provided with a prismatic flange, a head containing a bearing, a shaft mounted on the bearings in said angle housing and head and provided at each end thereof with a bevel gear, one of which meshes with the bevel gear on said drive shaft, a shaft in said head at an angle to the shaft in said housing and a drill nose on said shaft, both said housing shaft and said head shaft having intermeshing gears, a member threading in said head having a flange co-operating with said prismatic flange to swivel said head, and a sleeve surrounding said head and provided with prismatic means to engage said prismatic flange to lock said head against movement relatively thereto, said sleeve having an annular shoulder to rest upon the top of the flange of said member in said swivel head when in locking position and being manually movable to disengaging position from said prismatic flange, whereby the head may swivel relatively thereto.

2. In a drill, a body and a handle member having a driving shaft therein; an angle head on said body and handle member; a bored member secured in said angle head provided with a flange extending beyond said angle head; a swivel head; a bored member in said swivel head provided with a flange extending beyond said member and co-operating with the flange of said first named bored member to swivel said head; a drill nose having a shaft in said swivel head; a shaft connecting the driving shaft with said drill nose shaft, and a spring-pressed sleeve surrounding said swivel head and provided with means for engaging the flange of the member in said angle head to lock said swivel head against relative movement, said sleeve having a shoulder to rest upon the face of the flange on the member in the swivel head when in locking position and being manually movable against said spring to unlocking position whereby said swivel head may be turned.

3. In a drill, a body and handle member having a driving shaft therein; an angle head on said body and handle member; a bored member secured in said angle head provided with a flange and a cylindrical extension; a swivel head; a bored member in said swivel head fitting over the cylindrical extension of said first named bored member and provided with a flange co-operating with the flange of said first named bored member to swivel said head; a drill nose having a shaft in said swivel head; a shaft connecting the driving shaft with said drill nose shaft; a sleeve surrounding and spaced from said swivel head and provided with means to engage the flanges of said members to lock said swivel head against movement relative to said angle head, said sleeve having a shoulder and a spring engaging said shoulder to hold said sleeve in locking position, said sleeve being manually operable with respect to said swivel head to unlocking position, whereby said swivel head may be turned.

4. In a drill, a body and handle member having a driving shaft therein; an angle head on said body and handle member, a member secured in said angle head provided with a flange extending beyond said angle head and having a prismatic periphery; a swivel head; a bored member in said swivel head provided with a flange extending beyond said head and co-operating with said first named member to swivel said head, said last named flange having a prismatic periphery coinciding with the periphery of said first named flange; a drill nose having a shaft in said swivel head; a shaft connecting the driving shaft with said drill nose shaft, and a spring pressed sleeve surrounding said swivel head and provided with a prismatic wall in the end thereof to fit over the respective flanges and lock the swivel head against relative movement, said sleeve having stop means engaged by a spring to hold same in locking position and being manually movable to unlocking position whereby the swivel head may be turned relatively to said angle head.

WOODFORD J. CRUMP.